(12) United States Patent
Verma (10) Patent No.: US 11,676,105 B2
(45) Date of Patent: Jun. 13, 2023

(54) METHOD AND SYSTEM FOR VALIDATING TASKS IN A CHANGE MANAGEMENT PROCESS

(71) Applicant: HCL America Inc., Sunnyvale, CA (US)

(72) Inventor: Prafull Verma, Sunnyvale, CA (US)

(73) Assignee: HCL America Inc., Sunnyvale, CA (US)

( * ) Notice: Subject to any disclaimer, the term of this patent is extended or adjusted under 35 U.S.C. 154(b) by 0 days.

(21) Appl. No.: 17/025,596

(22) Filed: Sep. 18, 2020

(65) Prior Publication Data

US 2022/0092543 A1 Mar. 24, 2022

(51) Int. Cl.
| | | |
|---|---|---|
| *G06Q 10/10* | (2023.01) | |
| *G06Q 10/105* | (2023.01) | |
| *G06F 16/23* | (2019.01) | |
| *G06Q 10/0631* | (2023.01) | |
| *G06Q 10/0639* | (2023.01) | |

(52) U.S. Cl.
CPC ....... *G06Q 10/103* (2013.01); *G06F 16/2358* (2019.01); *G06Q 10/06316* (2013.01); *G06Q 10/06395* (2013.01); *G06Q 10/063114* (2013.01); *G06Q 10/105* (2013.01)

(58) Field of Classification Search
CPC ...................................................... G06Q 10/10
See application file for complete search history.

(56) References Cited

U.S. PATENT DOCUMENTS

| | | | |
|---|---|---|---|
| 7,330,822 B1 * | 2/2008 | Robson | G06Q 10/06 705/7.15 |
| 7,761,530 B2 | 7/2010 | Cain et al. | |
| 7,810,067 B2 | 10/2010 | Kaelicke et al. | |
| 2006/0184940 A1 * | 8/2006 | Urhan | G06F 9/46 718/100 |
| 2007/0168861 A1 * | 7/2007 | Bell | G06F 3/0481 715/701 |
| 2012/0016713 A1 * | 1/2012 | Wilcock | G06F 9/5038 |
| 2016/0188653 A1 * | 6/2016 | Anderson | G06Q 10/0633 718/105 |

* cited by examiner

*Primary Examiner* — Kurtis Gills (57) ABSTRACT

The present disclosure relates to a method and system for validating tasks in a change management process. A change request associated with one or more tasks is received. The change request may be defined through one or more attributes. Status of each task of one or more tasks is tracked. The tracking checks competition of each of the task associated with the change request and based on the tracking status of each of the task status of the change request is updated.

18 Claims, 5 Drawing Sheets

METHOD AND SYSTEM FOR VALIDATING TASKS IN A CHANGE MANAGEMENT PROCESS

CROSS-REFERENCE TO RELATED APPLICATION AND PRIORITY

The present application does not claim priority from any patent application

TECHNICAL FIELD

The present disclosure in general relates to a field of validating task in a change management process. More particularly, the present invention relates to a system and method of validating tasks in the change management process.

BACKGROUND

Change Management process ensures that all changes related to any service or product are recorded, evaluated, authorized, planned, developed, tested, implemented, documented, and reviewed in a controlled manner to minimize a risk of changes in operational and technical environments. The change management may involve human workflows for initiating, reviewing, approving, and authorizing the changes, scheduling them, notifying effected parties, enacting the changes, and keeping record of the changes. It also involves periodically auditing the IT environment to make sure that the records indeed reflect reality. The conventional methods of change management require manual verification of each step associated with a change request process. Such manual verification is not just time consuming, but such manual verification lacks automation may lead to errors.

SUMMARY

Before the present method and system of validating tasks in a change management process, is described, it is to be understood that this application is not limited to the particular system, and methodologies described, as there can be multiple possible embodiments which are not expressly illustrated in the present disclosure. It is also to be understood that the terminology used in the description is for the purpose of describing the particular version or embodiments only and is not intended to limit the scope of the present application. This summary is provided to introduce concepts related to method and system of validating tasks in a change management process. This summary is not intended to identify essential features of the claimed subject matter nor is it intended for use in determining or limiting the scope of the claimed subject matter.

In one implementation method of validating task in a change management process is described. The method comprises receiving, a change request. The change request may be associated with one or more tasks and the change request is defined through one or more attributes. The method further comprises tracking, status of each task of the one or more tasks. The tracking checks completion of each of the task associated with the change request. Further, the method comprises updating, status of the change request according to the tracking status of each of the task.

In one implementation, a system of validating task in a change management process is described. The system comprising a memory and a processor configured to execute set of instructions stored in a memory. The processor is configured to receive, a change request. The change request may be associated with one or more tasks and the change request is defined through one or more attributes. The processor is further configured to track, status of each task of the one or more tasks. The tracking checks completion of each of the task associated with the change request. Further, the processor is configured to update, status of the change request according to the tracking status of each of the task.

BRIEF DESCRIPTION OF DRAWING

The detailed description is described with reference to the accompanying figures. In the figure, the left-most digit (s) of a reference number identifies the figure in which the reference number first appears. The same number are used throughout the drawings to refer like features and components.

DETAILED DESCRIPTION

Some embodiments of the present disclosure, illustrating all its features, will now be discussed in detail. The words "including", "comprising", "consisting", "containing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any system and methods similar or equivalent to those described herein can be used in the practice or testing of embodiments of the present disclosure, the exemplary, system and methods for validating tasks in a change management process are now described. The disclosed embodiments of the system and method for validating tasks in a change management process are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for validating tasks in a change management process is not intended to be limited to the embodiment illustrated, but is to be accorded the widest scope consistent with principles and features described herein.

In change management process, request for changes may be difficult to track in some instances, especially when the change request is in a pending state. In many organizations with complex approval systems, a device may have multiple change requests pending that may adversely affect a proposed change request.

The present subject matter overcomes a problem of validating task in a change management system. Proposed system and method receive a change request associated with one or more task and based on tracking status of each task updating the status of the change request.

Before the proposed system and method are described, terms are defined below for understanding of the proposed system and method. Such definition of terms is exemplary for which intention is not to limit the scope of the invention.

Change Management System (CMS): Change management system is directed to all types of steps for improving a service, a product, or any other output. The CMS in disclosed embodiments refers to changes in IT Service Management (ITSM). The CMS tracks changes related to ITSM in areas of service management, problem and incident management, asset management and knowledge management. The CMS also refers to a structured approach for changing services or product to upgrade the service to higher level or to enhance the product quality related to the ITSM.

Change Management Process: Change management process considered here is related to the ITSM framework. Change management process is a process to create changes as "addition" "modification", "removal" of service that may enhance the functioning of services. The changes may include changes in IT infrastructure, processes, documents, supplier interfaces, etc.

Change request: A change request is a proposal to alter a product or system, often brought up by the client or another team member.

Tasks: The task is a step-in change management process related to change request. The example of change request may be review of a work done by a team member.

Hierarchy in the change management system: Models designed for implementing changes according to a dedicated role in within an enterprise or organization. The hierarchy involves different levels starting from a request receipt, a task allocation, a task implementation, a task validation, a request report and a request closure.

Doer-Checker System: In the doer checker system, a doer is responsible for creating a request and one who checks and approves the activity is termed as checker.

Figure 1:
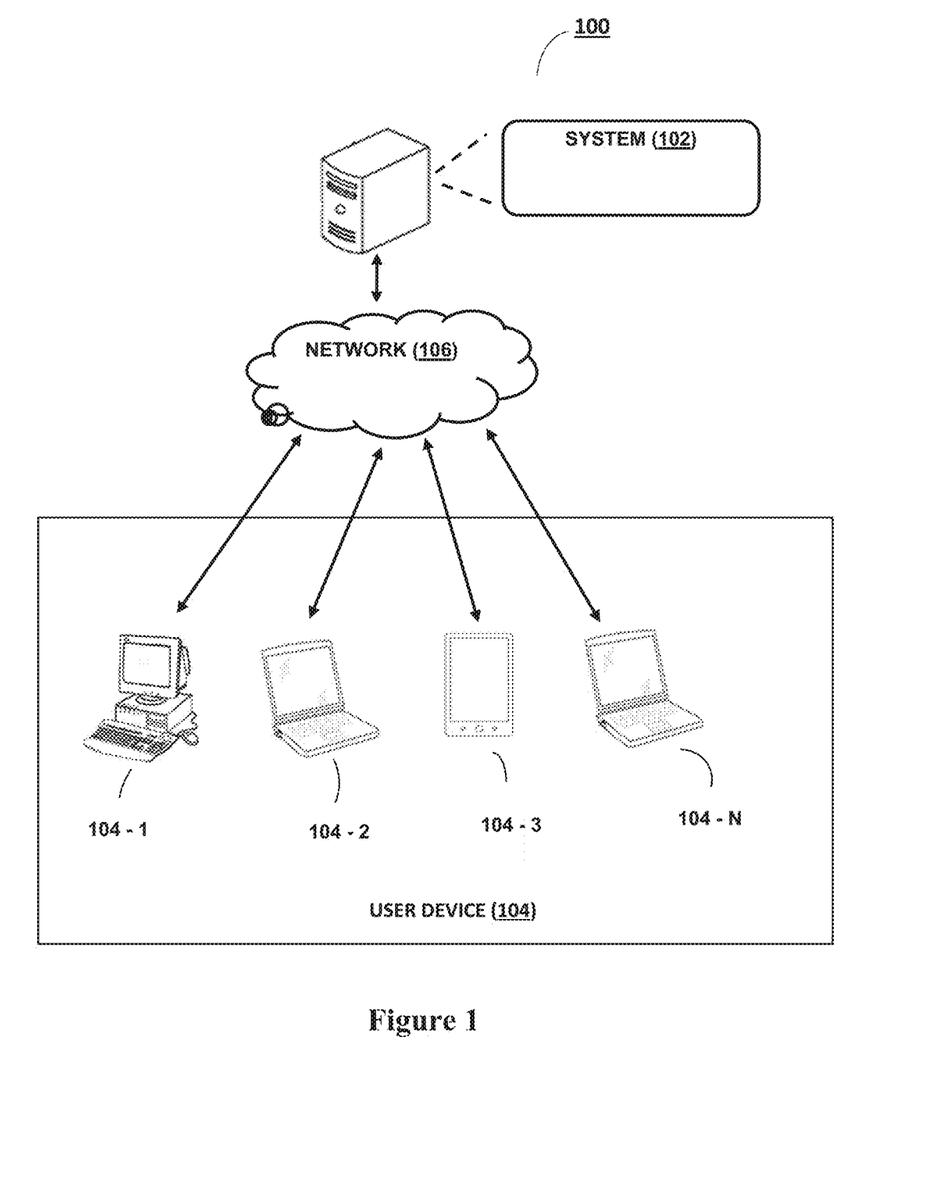
FIG. 1 illustrates a network implementation of a system 102 for validating tasks in a change management process, in accordance with an embodiment of the present subject matter.

Referring now to FIG. 1, a network implementation 100 of a system 102 for validating tasks in a change management process is disclosed. The system 102 here refers to the Change Management System 102 and will be referred to the system 102 throughout the description. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the storage system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
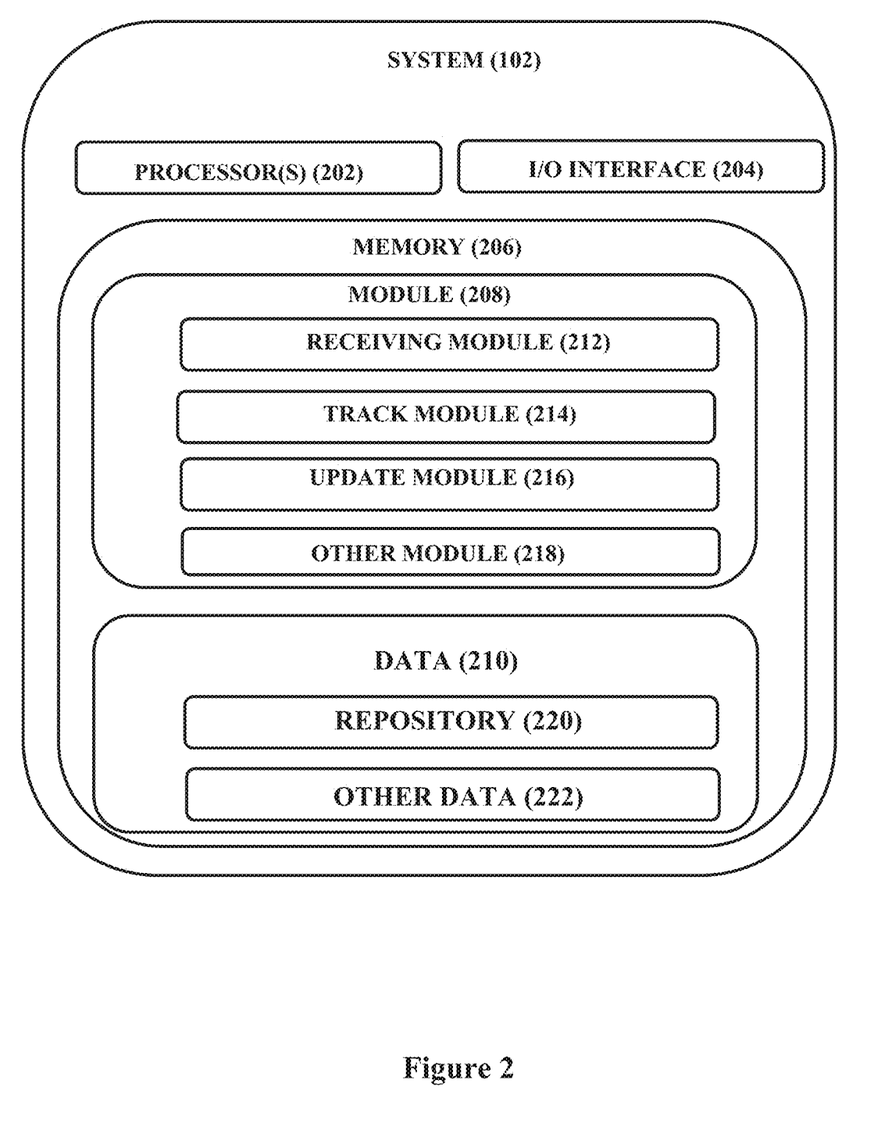
FIG. 2 illustrates an architecture of the system 102 for validating tasks in a change management process, in accordance with an embodiment of the present subject matter.

Referring to FIG. 2, configuration of the system 102 is shown. In one embodiment, the storage system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

In one implementation, a user may access the system 102 via the I/O interface. The user may be registered using the I/O interface in order to use the system 102. In one aspect, the user may access the I/O interface of the system 102 for obtaining information, providing input information, or configuring the system 102.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The memory 206 is connected to a plurality of modules 208. The module 208 may be configured within the memory 206 as software modules 208 or the modules 208 may be connected to each of the processor 202, the I/O interface 204 and the memory 206 as hardware modules. The modules 208 comprises a receiving module 212 configured to receive a change request associated with one or more tasks, a track module 214 may be configured to track status of each task of the one or more tasks, update module 216 configured to update status of the change request and other modules 218 for performing any other miscellaneous function in the storage system 100. The system 102 also comprises data 210 stored in a repository 220. The other data 222 refers to any data accessed by the storage system 100 for executing one or more operations while facilitating storage of configuration of service in a storage system 100. The other data 222 is also stored in the repository 220.

In an exemplary embodiment, the system 102 may be configured over a SaaS platform. SaaS is an operating model configured for delivering software as services to a user in the network 106. The SaaS is a code of the Product and is offered as a standard product offering change management process further providing features of Doer Checker, and Project Implementation Review (PIR) to a customer or a user. In one implementation the receiving module 212 may be configured to receive the change request. The change request may be associated with one or more tasks and the change request may be defined through one or more attributes. The task may depend on a nature of change. In an example if the change is related to database the task may be to run query update some items, if the change is related to network then the task may relate to execution of script at the network and if the change is associated with an app change then the task may be a change in code or testing. In an example, the attributes may comprise a change request number, a change request type, an expected start date, short description of the change request, detailed description of the change request, closure information.

In one implementation the change request may be associate with one of products in an enterprise or a service offered by the enterprise. In an example embodiment the change request may comprise raising a change ticket by a support staff. The change request may be raised on a request of a user.

Once the change ticket is raised, one or more tasks are created for completing the change request and accordingly one or more tasks are assigned to different peers in a predefined hierarchy in the enterprise.

For example, manager may accept the change ticket and a tech owner, service owner and Change Advisory Board (CAB) may approve the change ticket. On approval of change ticket, task associated with change may be completed. Further, on completion of the change ticket, project implementation report may be filled, and the ticket may be closed. In an example, the one or more task may comprise an implementation task. The implementation task may further comprise generation, modification or deletion of a new code, or a new script or a new db query. The implementation task here may be considered as a main task of a first task and a sub-task for the main task or a second task for the first task may be generated. The sub-task or the second task are generated for validating status or completion of the main task or the first task.

In one implementation, the track module 214 may be configured to track a status of each task of the one or more task and the tracking checks completion of each of the task associated with the change request. The track module 214 may be further configured to track status of task each of the one or more levels in the change management process. The one or more levels comprises support desk, change manager, tech owner, service owner, CAB and support group.

The track module 214 is further configured to block, any update in the status of the change request if there is any error in the status of the task. In case of any such error, an alert is generated for reporting the error in the status of the change request. In case of no error, the update in the status of the change request is enabled and the status may eb updated. Based on the update, the change request moves form one level to other level in a hierarchy of the change management system.

The system continuously tracks the status of the change request and in absence of the update, the change request remains with the level where the error is reported. Further, if an action is pending an any level, the system automatically sends notification to resolve the event. In such scenario, the change request, does not move to next level till the action is not fulfilled. In an example implementation, if tech owner has not approved the change request, the ticket may not move to the next step since the approval of tech owner is mandatory task of the change request for which validation task is generated to track if the change request if first approved or not.

Every time the task is completed, and no errors are observed, the system automatically updates the status of the task at that corresponding level. In one implementation, the status of the one or more tasks comprises an assigned status, performing status, validating status, a closed status or a cancelled status.

In one implementation, the update module 216 may be configured to update the status of the change request according to the tracking of the status of each of the task. The status of the change request comprises one of a create a new change request, open change request, closed change request, or cancelled change request, or modify the change request.

Figure 3:
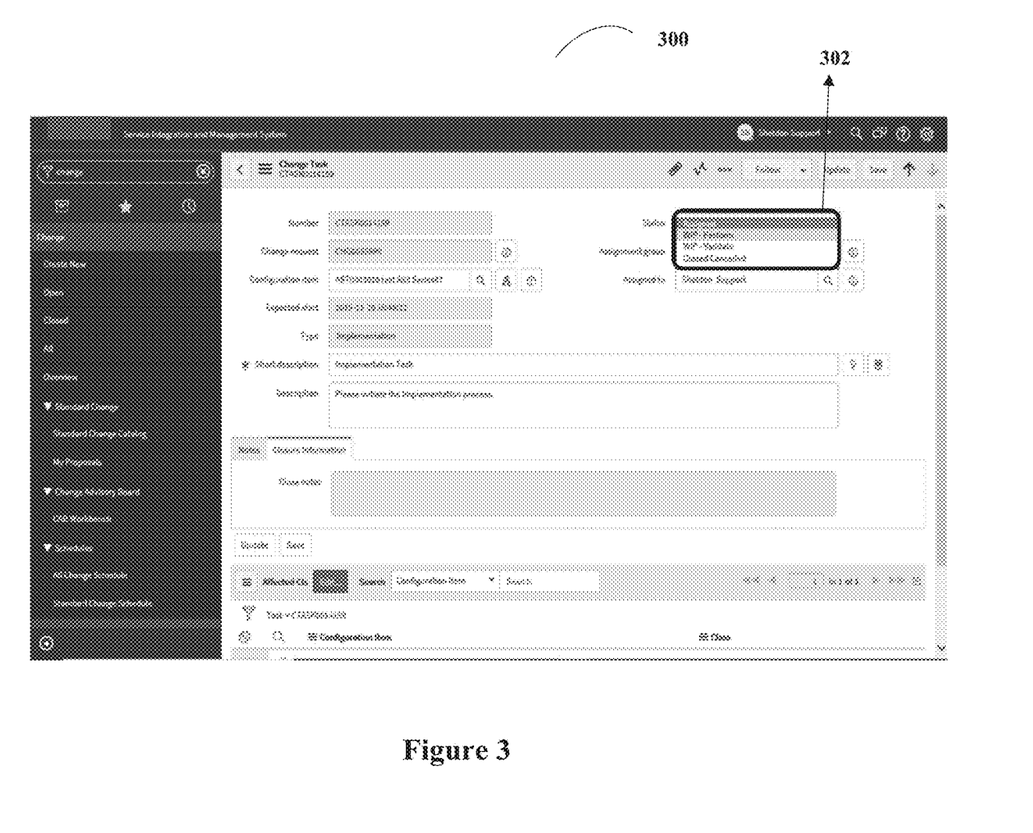
FIG. 3 illustrates a platform for validating task in a change management process, in accordance with an embodiment of the present subject matter.
Figure 4:
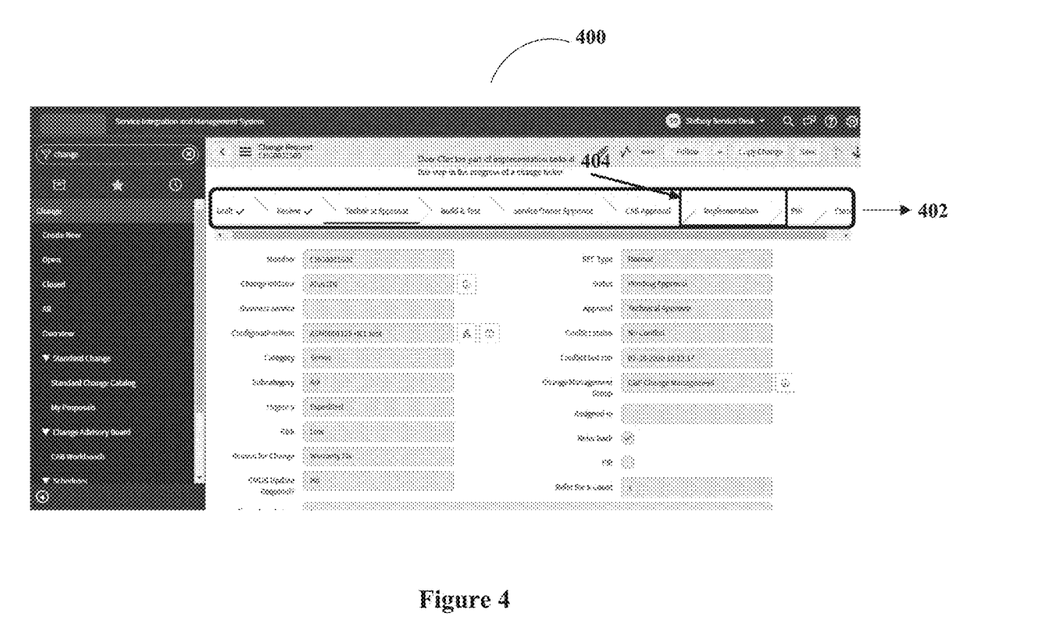
FIG. 4 illustrates a platform that shows steps involved in change request, in accordance with an embodiment of the present subject matter.

FIG. 3 now illustrates a doer checker functionality executed on the implementation tasks of the change management process. As illustrated functionality mandates the implementor to have the implementation validated by any other person involved. The implementation task may not be closed without the validation task. FIG. 4 further illustrates flow of task involved in change process. The various task in the change process may include draft (change request), review, technical approval, Build and test, Service owner approval, Cab approval, Implementation. PIR and close. FIG. 4 further, illustrates the doer checker part of the implantation task in the progress of the change request.

Figure 5:
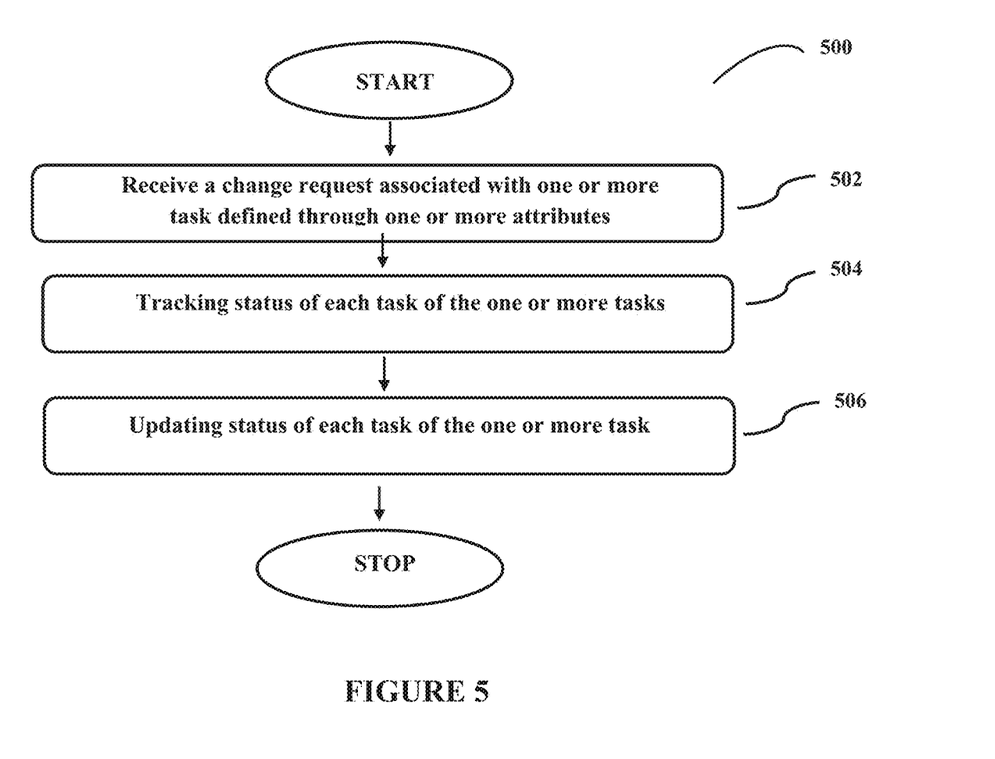
FIG. 5 illustrates a method for validating tasks in a change management process, in accordance with an embodiment of the present subject matter.

Referring now to FIG. 5, a method 500 for validating tasks in a change management process, is disclosed in accordance with an embodiment of the present subject matter. The method 500 may be described in the general context of computer executable instructions. Generally, computer executable instructions can include routines, programs, objects, components, data structures, procedures, modules, functions, and the like, that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method 500 can be implemented in any suitable hardware, software, firmware, or combination thereof. However, for ease of explanation, in the embodiments described below, the method 500 may be considered to be implemented in the above described system 102.

At block 502, the change request is received. The change request may be associated with one or more tasks and the change of request may be defined through one or more attribute.

The change request may be associated with one of the products in an enterprise or the service and the one or more attributes comprises the change request number, the change request type, the expected start date, short description of the change request, detailed description of the change request, closure information. In an example the implementation one or more task may comprise at least one of the implementation tasks. The implementation task may further comprise generation, modification or detection of the new code, or the new script or the new db query. The implementation task here may be considered as the main task of the first task and the sub-task for the main task or the second task for the first task may be generated. The sub-task or the second task are generated for validating status or completion of the main task or the first task At block 504, status of each task of the one or more tasks may be tracked and tracking may check completion of each of the task associated with the change request. The tracking may further track the status of each of the at one or more levels in the change management process. The one or more levels comprises support desk, change manager, tech owner, service owner, Change Advisor Board (CAB) and support group. Further, tracking may comprise blocking, the update in the status of the change request in case of any error in the status of the task and generate an alert towards the error in the status of the change request.

In one implementation the status of one or more tasks comprises an assigned status, performing status, validating status, closed status, or a canceller status.

At block, 506, status of the change request may be updated according to the tracking status of each of the task. Further, the status of the change request comprises create a new change request, open change request, closed change request, or cancelled change request.

Exemplary embodiments discussed above may provide certain advantages. Though not required to practice aspects of the disclosure, the advantages may include those provided by the following features.

Some embodiment of the system 102 and the method 500 may minimize the risk of error in the implementation stage.

Some embodiment of the system 102 and the method 500 may perform change request accurately and efficiently.

Some embodiment of the system 102 and the method 500 may enable performance of the task to completely change, this helps in appropriate assignment of the level at early stage and the change request may be moved to next level when the implementation tasks are fulfilled.

I claim:

1. A method of validating tasks in a change management process, the method comprising:
   receiving a change request, wherein the change request is associated with one or more tasks, wherein the change request is defined through one or more attributes;
   tracking status of each task of the one or more tasks at one or more levels in the change management process, wherein the one or more levels comprises a predefined hierarchy in an enterprise facilitating the change management process, wherein the tracking checks completion of each of the task associated with the change request, wherein the tracking comprises:
      blocking the update in the status of the change request in case of any error in the completion of the task; and
      generating an alert towards the error in the status of the change request; and
   updating status of the change request according to the tracking status of each of the task, wherein the update is enabled in the status of the change request in case of no error in the completion of the task.

2. The method as claimed in claim 1, wherein the change request is associated with one of a product in an enterprise, a service facilitated through an enterprise.

3. The method as claimed in claim 1, wherein the one or more attributes comprise a change request number, a change request type, an expected start date, short description of the change request, detailed description of the change request, closure information.

4. The method as claimed in claim 1, wherein the one or more tasks comprises at least one of an implementation task, and a testing task created as a sub-task for validating the implementation task.

5. The method as claimed in claim 1, wherein the status of the one or more tasks comprises an assigned status, performing status, validating status, a closed status, or a cancelled status.

6. The method as claimed in claim 1, wherein the status of the change request comprises create a new change request, open change request, closed change request, or cancelled change request.

7. A system for validating tasks in a change management process, the system comprising:
   a memory;
   a processor (202) configured to execute set of instructions stored in the memory, wherein the processor (202) is configured to:
      receive a change request, wherein the change request is associated with one or more tasks, wherein the change request is defined through one or more attributes;
      track status of each task of the one or more tasks at one or more levels in the change management process, wherein the one or more levels comprises a predefined hierarchy in an enterprise facilitating the change management process, wherein the tracking checks completion of each of the task associated with the change request, wherein the tracking comprises:
         blocking the update in the status of the change request in case of any error in the completion of the task; and
         generating an alert towards the error in the status of the change request; and
      update status of the change request according to the tracking status of each of the task, wherein the update is enabled in the status of the change request in case of no error in the completion of the task.

8. The system as claimed in claim 7, wherein the change request is associated with one of a product in an enterprise, a service facilitated through an enterprise or organization.

9. The system as claimed in claim 7, wherein the one or more attributes comprise a change request number, a change request type, an expected start date, short description of the change request, detailed description of the change request, closure information.

10. The system as claimed in claim 7, wherein the one or more tasks comprises at least one of an implementation task, and a testing task created as a sub-task for validating the implementation task.

11. The system as claimed in claim 7, wherein the status of the one or more tasks comprises an assigned status, performing status, validating status, a closed status, or a cancelled status.

12. The system as claimed in claim 7, wherein the status of the change request comprises create a new change request, open change request, closed change request, or cancelled change request.

13. The method as claimed in claim 1, further comprising generating the one or more tasks assigned to a set of peers in a predefined hierarchy in an enterprise, wherein the one or more tasks comprise at least a main task of a first task, a sub task of the main task, and a second task of the first task, and wherein the sub task and the second task are generated for validating completion of the main task and the first task respectively.

14. The method as claimed in claim 1, further comprising generating a project implementation report based on the completion of the task.

15. The method as claimed in claim 1, further comprising transmitting a notification to a concerned peer from the set of peers for resolution of a pending action, based on the error in the status of the change request.

16. The system as claimed in claim 7, wherein the processor is further configured to generate the one or more tasks assigned to a set of peers in a predefined hierarchy in an enterprise, wherein the one or more tasks comprise at least a main task of a first task, a sub task of the main task, and a second task of the first task, and wherein the sub task and the second task are generated for validating completion of the main task and the first task respectively.

17. The system as claimed in claim 7, wherein the processor is further configured to generate a project implementation report based on the completion of the task.

18. The system as claimed in claim 7, wherein the processor is further configured to transmit a notification to a concerned peer from the set of peers for resolution of a pending action, based on the error in the status of the change request.

* * * * *